G. H. RICE.
AUTOMATIC UNCOUPLING MEANS FOR SHAFT CLUTCHES.
APPLICATION FILED MAR. 28, 1917.
1,242,724.  Patented Oct. 9, 1917.
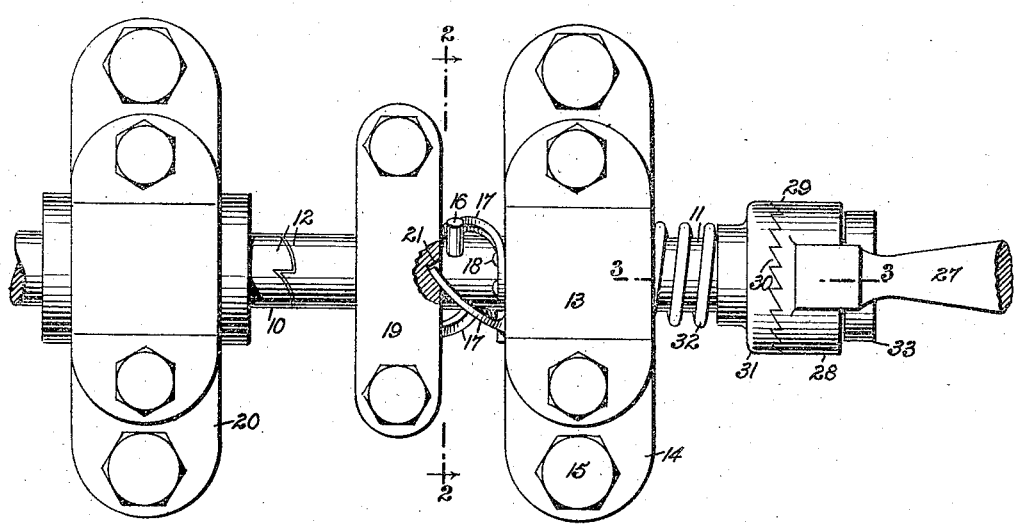
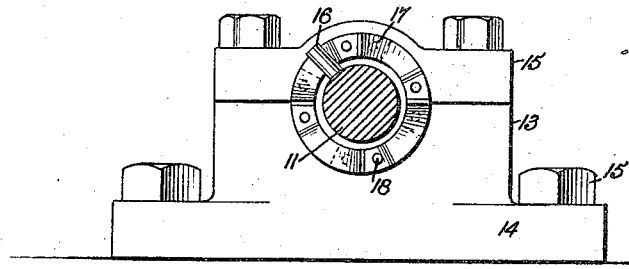
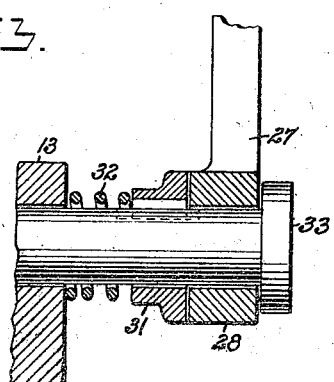
WITNESSES
H. J. Walker
J. L. McAuliffe
INVENTOR
George H. Rice
BY Munn & Co
ATTORNEYS

UNITED STATES PATENT OFFICE.

GEORGE HENRY RICE, OF HONOLULU, TERRITORY OF HAWAII.

AUTOMATIC UNCOUPLING MEANS FOR SHAFT-CLUTCHES.

1,242,724.     Specification of Letters Patent.     Patented Oct. 9, 1917.

Application filed March 28, 1917. Serial No. 157,907.

*To all whom it may concern:*

Be it known that I, GEORGE H. RICE, a citizen of the United States, and a resident of the city and county of Honolulu, Territory of Hawaii, have invented a new and Improved Automatic Uncoupling Means for Shaft-Clutches, of which the following is a full, clear, and exact description.

My invention is more particularly intended for use in connection with the crank shaft of an automobile or autotruck, and has for an object to provide in connection with the crank shaft, a novel arrangement of stop means operable to arrest reverse turning movement of the said shaft, whereby to prevent injury to the operator by the crank handle should the engine back-fire.

In carrying out my invention in the present form, use is made of a stop pin projecting laterally from the crank shaft and co-acting resilient fingers disposed more or less spirally and secured at one end to a relatively fixed part, the arrangement being such that the stop pin of the crank shaft will wipe past the free ends of the fingers in succession, but should the crank shaft be given a reverse movement by the back-fire of the engine giving a reverse movement to the engine shaft, one of the fingers will present a barrier to the reverse turning movement of the pin on the crank shaft and cause the latter shaft to be unclutched.

Reference is to be had to the accompanying drawings forming a part of this specification in which similar reference characters indicate corresponding parts in all the views.

Figure 1 is a plan view of portions of a driven shaft and a crank shaft having my invention associated therewith;

Fig. 2 is a transverse vertical section on the line 2—2, Fig. 1;

Fig. 3 is a detail in longitudinal vertical section on the line 3—3, Fig. 1.

In the illustrated example, the numeral 10 indicates a driven shaft, such as the shaft of an automobile, and 11 indicates a crank shaft, said shafts having mating clutch elements 12. The crank shaft 11 turns in a bearing 13, here shown as having a base plate 14 which may be secured in any desired manner to any fixed part as by bolts or machine screws 15.

On the crank shaft 11 and to turn therewith, is a lateral stud 16, and secured to the bearing 13 or other fixed part by rivets 18 or other means is a series of fingers 17. The fingers 17 are spirally arranged about the shaft 11 and the free ends thereof are flexible and are received in notches 21 in a bearing 19 or other fixed part adjacent to the bearing 13. The numeral 20 indicates a bearing for the shaft 10.

The shaft 11 is preferably operated by a crank handle 27 which I prefer to form of a hub 28 loose on the said shaft and formed with clutch teeth 29 engaging clutch teeth 30 on a clutch element 31 keyed on the shaft 11 to turn therewith, but to slide thereon. A spring 32 is interposed between the clutch element 31 and the adjacent bearing 13 and normally tends to keep the element 31 in clutched engagement with the hub 28, the said hub and clutch element turning between the spring 32 and head 33 on the shaft 11.

With the described arrangement, the shaft 11, through the medium of the handle 27, is moved axially into clutched engagement with the shaft 10 and given a turn to crank the engine. With the turning of the shaft 11, the pin 16 will wipe over the ends of the fingers 17 and after passing each finger, the finger will be automatically restored to a position back of the pin. Should reverse movement be given to the shaft 11 by back-fire of the engine, the pin 16 will engage the adjacent finger 17 and be moved in a direction to unclutch the teeth 12.

It is to be understood that the illustrated construction is merely given as a form of the invention and that the mechanical construction may be varied within the terms of the appended claims.

Having thus described my invention, I claim as new and desire to secure by Letters Patent:

1. The combination with a driven shaft and a drive shaft slidable relatively to the driven shaft, said shafts having mating clutch elements, of a lateral stop member on the drive shaft, and co-acting stop members in the form of flexible fingers secured to a relatively fixed part and spirally disposed about the drive shaft in the path of the lateral stop on said drive shaft.

2. The combination with a driven shaft and a drive shaft slidable relatively to the driven shaft, said shafts having mating clutch elements, of a lateral stop member on the drive shaft, and co-acting stop members in the form of flexible fingers secured to a relatively fixed part and spirally disposed about the drive shaft in the path of the lateral stop on said drive shaft; together with a relatively fixed member having notches receiving the free ends of the flexible fingers.

GEORGE HENRY RICE.

Copies of this patent may be obtained for five cents each, by addressing the "Commissioner of Patents, Washington, D. C."